US006670900B1

United States Patent
Zhang

(10) Patent No.: US 6,670,900 B1
(45) Date of Patent: Dec. 30, 2003

(54) QUADRATURE MISMATCH COMPENSATION

(75) Inventor: Yifeng Zhang, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/280,853

(22) Filed: Oct. 25, 2002

(51) Int. Cl.[7] .............................................. H03M 1/06
(52) U.S. Cl. ........................ 341/118; 341/110; 455/86
(58) Field of Search ................................ 341/118, 110, 341/120, 143, 144, 155; 455/324, 313, 323, 86, 42, 326, 309, 312

(56) References Cited

U.S. PATENT DOCUMENTS

| | | | | |
|---|---|---|---|---|
| 5,432,779 A | * | 7/1995 | Shimo et al. .............. 370/206 |
| 5,511,236 A | * | 4/1996 | Umstattd et al. ............ 455/76 |
| 5,598,436 A | | 1/1997 | Brajal et al. | |
| 5,937,335 A | * | 8/1999 | Park et al. .................... 455/86 |
| 5,937,341 A | * | 8/1999 | Suominen ................... 455/324 |
| 6,298,035 B1 | | 10/2001 | Heiskala | |
| 6,529,472 B1 | * | 3/2003 | Kaneko et al. ............. 370/208 |
| 2003/0003891 A1 | * | 1/2003 | Kivekas ....................... 455/313 |

\* cited by examiner

Primary Examiner—Brian Young
Assistant Examiner—John Nguyen
(74) Attorney, Agent, or Firm—Michael J. Ure

(57) ABSTRACT

A combination of pre-distortion and post-distortion processes compensate for errors in I/Q channel orthogonality. The pre-distortion and post-distortion processes are calibrated to compensate for these errors at a variety of frequencies across a frequency span, thereby providing frequency-dependent compensation for I/Q channel mismatch. Pre-distortion calibration is effected by coupling the filtered analog I/Q modulated signals from the transmitter of a wireless transceiver directly to the analog-to-digital converters of the receiver of the wireless transceiver. Coupling the analog I/Q modulated signals from the transmitter directly to the channel filters that precede the analog-to-digital converters of the receiver effects post-distortion calibration.

18 Claims, 1 Drawing Sheet

QUADRATURE MISMATCH COMPENSATION

BACKGROUND OF THE INVENTION

1. Field of the Invention

This invention relates to the field of communications, and in particular to a quadrature transceiver that includes pre-distortion and post-distortion compensation for frequency-dependent I/Q channel mismatch.

2. Description of Related Art

The use of quadrature modulation and demodulation is a common communication technique for communicating digital data as a stream of two-bit symbols. A first stream corresponding to one of the bits of the symbol is modulated by an "in-phase" (I) oscillation signal, and a second stream corresponding to the other bit of the symbol is modulated by a "quadrature-phase" (Q) oscillation signal that is ninety degrees out of phase from the in-phase (I) oscillation signal. The I and Q modulated signals are combined to form a composite signal for transmission. The orthogonal nature of the modulation allows for a reliable demodulation of individual I and Q modulated bit streams at a receiving system.

IEEE 802.11a/g specifies an Orthogonal Frequency Division Multiplex (OFDM) scheme that employs a combination of frequency division multiplexing and quadrature modulation and demodulation to effect high-speed wireless data transfer. At the OFDM transmitter, the outputs of a plurality of quadrature modulation systems are frequency-division-multiplexed for transmission to a corresponding OFDM receiver. As in all quadrature modulation and demodulation systems, OFDM systems are sensitive to phase shifts that cause the I and Q modulated signals to become non-orthogonal, commonly termed "I/Q channel mismatch".

U.S. Pat. No. 6,298,035 "ESTIMATION OF TWO PROPAGATION CHANNELS IN OFDM", issued Oct. 2, 2001 to Juha Heiskala, incorporated by reference herein, provides an overview of the principles of OFDM modulation and demodulation, and discloses a method of estimating the frequency response of each channel by transmitting select training symbols between two transceivers. This method particularly addresses the frequency-dependent effects caused by multipath fading and interference, and provides an adaptive solution based on actual transmissions from one transceiver to another.

BRIEF SUMMARY OF THE INVENTION

It is an object of this invention to provide a system and method that minimizes I/Q channel mismatch. It is a further object of this invention to provide a system and method for minimizing I/Q mismatch across a range of frequencies. It is a further object of this invention to provide a system and method that effects autonomous I/Q mismatch compensation within a single transceiver.

These objects, and others, are achieved by providing a combination of pre-distortion and post-distortion processes that compensate for errors in I/Q channel orthogonality. The pre-distortion and post-distortion processes are calibrated to compensate for these errors at a variety of frequencies across a frequency span, thereby providing frequency-dependent compensation for I/Q channel mismatch. Pre-distortion calibration is effected by coupling the filtered analog I/Q modulated signals from the transmitter of a wireless transceiver directly to the analog-to-digital converters of the receiver of the wireless transceiver. Post-distortion calibration is effected by coupling the analog I/Q modulated signals from the transmitter directly to the channel filters that precede the analog-to-digital converters of the receiver.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
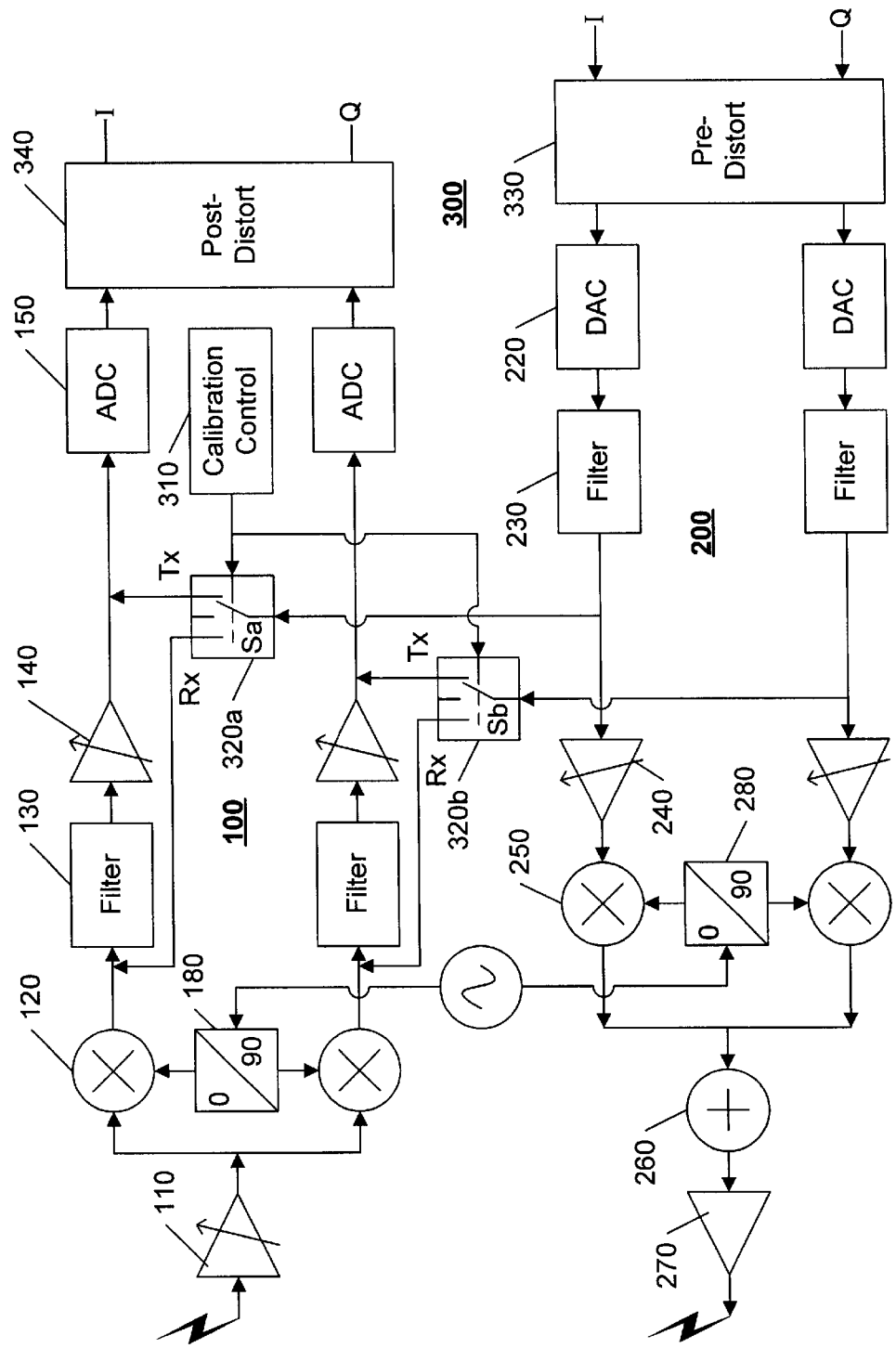
FIG. 1 illustrates an example block diagram of a transceiver with pre-distortion and post-distortion compensation for I/Q channel mismatch in accordance with this invention.

This invention is premised on the observation that a substantial amount of I/Q channel mismatch can be introduced by the filters that are used at the transmitter to limit the bandwidth of the I/Q modulated output and the filters that are used at the receiver to isolated the transmitted I/Q modulated signal. This "locally-produced" I/Q mismatch is particularly acute in OFDM systems because of the filtering required at each of the plurality of quadrature modulation systems to avoid interference with each other, and because of the filtering required to isolate each of the frequency-division-multiplexed quadrature-modulated signals.

FIG. 1 illustrates an example block diagram of a transceiver with pre-distortion and post-distortion compensation for locally produced I/Q channel mismatch in accordance with this invention. The transceiver includes a conventional receiver section 100, comprising the components whose reference numerals start with the digit "1", a conventional transmitter section 200, comprising the components whose reference numerals start with the digit "2", and a calibration/compensation section 300, comprising the components whose reference numerals start with the digit "3".

The receiver 100 includes a tunable front end 110 whose output is demodulated by a quadrature demodulator to provide quadrature output signals I and Q. For ease of illustration, only one branch of the quadrature demodulator is described herein, the other branch being functionally equivalent, but operating at an orthogonal phase provided by the quadrature phase generator 180. The output of the front end 110 is demodulated by a mixer 120, and filtered by a filter 130. A tunable amplifier 140 provides a baseband analog signal, which is converted into digital samples via the analog-to-digital converter (ADC) 150.

The transmitter 200 receives two digital streams for I and Q channel modulation and transmission. As with the receiver 100, for ease of illustration, only one branch of the quadrature modulator is described herein, the other branch being functionally equivalent. A digital-to-analog (DAC) converter 220 converts the samples of the digital input stream into an analog signal that is filtered by the filter 230 and provided to a tuned amplifier 240. The mixer 250 provides the quadrature modulation, the streams being mixed via modulation signals I and Q that are separated in phase by ninety degrees. The adder 260 combines the quadrature-modulated signals, and an amplifier 270 prepares the composite signal for transmission.

Of particular note are the filters 130 and 230. These filters are bandpass filters that are configured to attenuate signals above a given cutoff frequency. As is known in the art, in addition to providing this frequency-dependent attenuation, filters generally introduce a frequency-dependent phase-shift. If the filters in each channel are identical, the phase-shift that is introduced will be of no consequence. In the receiver 100, if the received signal includes orthogonal components, the quadrature mixers 120 will provide output streams that are in-phase with each other. If the filters 130 in each channel are identical, the phase-shift that is introduced to each stream will be identical, and the streams remain in-phase relative to each other. In the transmitter 200, the input streams to each channel are assumed to be in-phase with each other. If the filters 230 in each channel are identical, the streams remain in-phase relative to each other, and the quadrature modulation via the mixers 250 provides output signals that are phase-shifted from each other by ninety degrees.

If either of the pairs of filters 130, 230 are not identical, the streams that are nominally in-phase with each other will exhibit a phase-shift relative to each other, particularly at or near the cutoff frequency of the filter, where the substantial frequency-dependent attenuation and frequency-dependent phase-shift are introduced in each channel. At the receiver 100, if orthogonal signals are received, the input to each filter 130 will be in-phase with each other, but if the filters 130 in each channel are not identical, the output stream from the filters 130 will be out of phase with each other. If the phase-shift difference between the filters is substantial, the bit-stream output from the ADC 150 of the channels will be out of phase with each other.

As noted above, OFDM systems are particularly susceptible to frequency-dependent phase-shifts because of the sharp cutoffs required to minimize interference and to isolate transmitted signals. Although each filter pair 130, 230 is designed to comprise identical filters in each channel, the fabrication process can introduce unpredictable variations in the actual cutoff frequency realized by each filter. Because of the sharp filter response required, minor shifts in the cutoff frequency can introduce substantial phase-differences between the filters in each of the I/Q channels.

In accordance with this invention, an autonomous calibration/compensation system 300 is included within the receiver 100 and transmitter 200 of the transceiver. To compensate for the phase-shifts produced by the filter 230 in the transmitter 200, a pre-distortion component 330 is provided that bit-phase-shifts one of the digital input streams such that the outputs from the filters 230 are in-phase with each other, corresponding to the assumed in-phase relationship between the two digital input streams. That is, as required, the pre-distortion component 330 delays one of the I or Q digital input streams, based on the analog-phase-shift that is produced by the filters 230, as fabricated. Although an independent output processor could be used to determine the phase shift that is introduced by the transmit filters 230, a preferred embodiment of this invention uses the output of the ADCs 150 to decode the analog outputs from the filters 230. In-phase test signals are applied to the DACs 220 and filters 230, and the degree of bit-shift that is introduced by the filters 230 and DAC 220 is determined by comparing the output of the ADCs 150 to the in-phase test signals.

To compensate for phase-shifts produced by the filter 130 in the receiver 100, a post-distortion component 340 applies a bit-phase-shift to one of the I/Q digital output streams from the receiver 100 so that the streams are placed back in-phase, corresponding to their assumed in-phase condition from the mixers 120. That is, as required, the post-distortion component 340 delays one of the I or Q output streams, based on the analog-phase-shift that is produced by the filters 130 as fabricated. Although an independent test signal could be generated to determine the required compensation, a preferred embodiment of this invention uses the "in-phase" channel signals from the transmitter 200. Again, a test sequence is applied to the input of the transmitter 200, and the output of the ADCs 150 are compared to the test sequence to determine the amount of bit-phase-shift that is caused by the analog-phase-shift introduced by the filters 130.

A calibration controller 310 controls switches 320a–b to selectively engage the calibration process, and to selectively couple the analog signals from the transmitter to either the ADCs 150, for calibration of the filters 230, or to the filters 130, for calibration of the filters 130. In a preferred embodiment, the aforementioned test sequence that is provided to the transmitter 200 is configured to provide a calibration measure across a range of frequencies so as to allow for a frequency-dependent calibration and compensation method and system.

In a preferred embodiment, during transmitter calibration with the pre-distortion component 330 disabled, a signal $I_n=\cos(\omega_n t)$ is applied to the I input, and $Q_n=\sin(\omega_n t)$ is applied to the Q input for each of the sub-carriers of the OFDM signal, where $\omega_n$ is the $n^{th}$ sub-carrier of the OFDM signal. As illustrated in FIG. 1, in the transmit-calibration mode, the output of the filters 230 from this applied input is fed directly to the ADC converters 150 in the receiver 100. Defining $R_I$ as the I output, and $R_Q$ as the Q output of the receiver 100, the transmitter gain imbalance $g_T$ and phase imbalance $\theta_T$ at each $\omega_n$ is given as:

$$g_{T_n} = \left| \frac{R_{Q_n}}{R_{I_n}} \right| \quad \text{and} \quad (1)$$

$$\theta_{T_n} = \arg\left( \frac{R_{Q_n}}{R_{I_n}} \right). \quad (2)$$

Designating $I_0$ and $Q_0$ as the input to the transmitter, I/Q imbalance at this $\omega_n$ can be represented in matrix form as:

$$\begin{bmatrix} I \\ Q \end{bmatrix} = A_{T_n} \begin{bmatrix} I_0 \\ Q_0 \end{bmatrix} \quad (3)$$

where $$A_{T_n} = \begin{bmatrix} 1 & -g_{T_n}\cos\theta_n \\ 0 & g_{T_n}\cos\theta_{nT} \end{bmatrix} \text{ is the transmitter imbalance matrix.} \quad (4)$$

To compensate for this transmitter I/Q imbalance, the inverse of the transmitter imbalance matrix $A_{T_n}$ is applied at the pre-distortion component 330 at each ωn, wherein $$A_{T_n}^{-1} = \begin{bmatrix} 1 & tg(\theta_{T_n}) \\ 0 & 1/g_{T_n}\cos(\theta_{T_n}) \end{bmatrix}. \quad (5)$$

In a preferred embodiment, during receiver calibration with the pre-distortion component 330 enabled to compensate for the transmitter I/Q imbalance, and the post-distortion component 340 disabled, a signal $I_n=\cos(\omega_n t)$ is applied to the I input, and $Q_n=\sin(\omega_n t)$ is applied to the Q input of the transmitter 200, for each of the sub-carriers of the OFDM signal, where $\omega_n$ is the $n^{th}$ sub-carrier of the OFDM signal. As illustrated in FIG. 1, in the receive-calibration mode, the output of the filters 230 from this applied input is fed directly to the filters 130 in the receiver

100. Defining $R_I$ as the I output, and $R_Q$ as the Q output of the receiver 100, the receiver gain imbalance $g_R$ and phase imbalance $\theta_R$ at each $\omega_n$ is given as:

$$g_{R_n} = \left|\frac{R_{Q_n}}{R_{I_n}}\right| \quad \text{and} \quad (6)$$

$$\theta_{R_n} = \arg\left(\frac{R_{Q_n}}{R_{I_n}}\right). \quad (7)$$

Designating $I_0$ and $Q_0$ as the input to the transmitter, I/Q imbalance at this $\omega_n$ can be represented in matrix form as:

$$\begin{bmatrix} I \\ Q \end{bmatrix} = A_{R_n} \begin{bmatrix} I_0 \\ Q_0 \end{bmatrix} \quad (8)$$

where $$A_{R_n} = \begin{bmatrix} 1 & -g_{R_n}\cos\theta_{R_n} \\ 0 & g_{R_n}\cos\theta_{R_n} \end{bmatrix} \text{ is the receiver imbalance matrix.} \quad (9)$$

To compensate for this receiver I/Q imbalance, the inverse of the imbalance matrix $A_{R_n}$ is applied at the post-distortion component 340 at each $\omega n$, wherein $$A_{R_n}^{-1} = \begin{bmatrix} 1 & tg(\theta_{R_n}) \\ 0 & 1/g_{R_n}\cos(\theta_{R_n}) \end{bmatrix}.$$

By applying the inverse of the transmitter I/Q imbalance at the pre-distortion component 330, and the inverse of the receiver I/Q imbalance at the post-distortion component 340, the effects of transmitter and receiver I/Q imbalance in a transceiver are minimized.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:

1. A communications device comprising:
  a receiver that includes:
    a quadrature demodulator that is configured to receive a transmitted signal and to provide therefrom a pair of quadrature demodulated signals,
    a pair of receiver-filters that are configured to selectively receive one of:
      the pair of quadrature demodulated signals, and
      a pair of receiver-calibration signals, and
      to produce therefrom a pair of receiver-filtered signals, and
    at least one post-distortion component that is configured to apply a set of frequency-dependent corrections to at one of the pair of receiver-filtered signals when the pair of quadrature demodulated signals are received at the pair of receiver-filters, based on values of the receiver-filtered signals when the pair of receiver-calibration signals are received at the pair of receiver-filters.

2. The communications device of claim 1, wherein the receiver further includes
  a pair of analog-to-digital converters that are configured to digitize the pair of receiver-filtered signals for processing by the at least one post-distortion component.

3. The communications device of claim 1, further including
  a transmitter that is configured to receive a pair of test signals and to produce therefrom the pair of receiver-calibration signals.

4. The communications device of claim 3, wherein the transmitter includes
  at least one pre-distortion component that is configured to apply a set of frequency-dependent corrections to at least one of the pair of test signals, to provide quadrature-corrected test signals, and
  a pair of transmitter-filters that are configured to receive the quadrature-corrected test signals, and to provide therefrom the receive-calibration signals.

5. The communications device of claim 4, wherein the pair of test signals are encoded in digital form, and the transmitter further includes
  a pair of digital-to-analog converters that are configured to receive the quadrature-corrected test signals and to convert the quadrature-corrected test signals to an analog form for processing by the pair of transmitter-filters.

6. The communications device of claim 3, wherein the transmitter is also configured to receive a pair of input signals, and
the transmitter further includes
  at least one pre-distortion component that is configured to apply a set of frequency-dependent corrections to at least one of the pair of input signals, to provide quadrature-corrected input signals,
  a pair of transmitter-filters that are configured to receive the quadrature-corrected input signals, and to provide therefrom a pair of quadrature-corrected analog signals, and
  a quadrature modulator that is configured to receive the quadrature-corrected analog signals and to provide therefrom a quadrature-modulated composite signal for transmission.

7. The communications device of claim 6, wherein the pair of input signals are encoded in digital form, and the transmitter further includes
  a pair of digital-to-analog converters that are configured to receive the quadrature-corrected input signals and to convert the quadrature-corrected input signals to an analog form for processing by the pair of transmitter-filters.

8. The communications device of claim 1, wherein the pair of receiver-calibration signals includes a plurality of pairs of frequency-dependent receiver-calibration signals,
each pair of the plurality of pairs of frequency-dependent receiver-calibration signals corresponding to a different frequency.

9. The communications device of claim 8, wherein the plurality of pairs of frequency-dependent receiver-calibration signals corresponds to a plurality of sub-carriers of an Orthogonal Frequency Division Multiplex (OFDM) transmission scheme.

10. A communications device comprising
a transmitter that includes:
  a pair of transmitter-filters that are configured to receive a pair of quadrature-test signals and to produce therefrom a pair of transmitter-calibration signals, and
  at least one pre-distortion component that is configured to apply a set of corrections to subsequent pairs of input signals to the transmitter, to provide quadrature-corrected input signals to the pair of transmitter-filters, and a decoder that is configured to process the pair of transmitter-calibration signals so as to produce a pair of quadrature-output signals that can be compared to the pair of quadrature-test signals to provide a measure of quadrature-mismatch between the pairs of transmitter-calibration signals, wherein the set of corrections are based on the measure of quadrature-mismatch between the pairs of transmitter-calibration signals.

11. The communications device of claim 10, wherein the pair of quadrature-test signals are encoded in digital form, and the transmitter further includes a pair of digital-to-analog converters that are configured to receive the quadrature-test signals and to convert the quadrature-test signals to an analog form for processing by the pair of transmitter-filters.

12. The communications device of claim 10, wherein the transmitter further includes a quadrature modulator that is configured to receive a pair of filtered input signals from the pair of filters, and to provide therefrom a quadrature-modulated composite signal for transmission.

13. The communications device of claim 12, wherein the pair of input signals are encoded in digital form, and the transmitter further includes a pair of digital-to-analog converters, operably coupled between the at least one pre-distortion component and the pair of transmitter-filters, that are configured to receive the quadrature-corrected input signals and to convert the quadrature-corrected input signals to an analog form for processing by the pair of transmitter-filters.

14. The communications device of claim 10, further including a receiver that is configured to receive a quadrature-modulated signal, to produce therefrom a pair of quadrature-demodulated signals, wherein the decoder is included in the receiver, and is selectively used to provide the pair of quadrature-output signals from one of:
the pair of transmitter-calibration signals, and
the pair of quadrature-demodulated signals.

15. A method of correcting for quadrature-mismatch in a communications device, comprising:

applying a pair of quadrature-test signals to a filter in the communications device, to produce therefrom a pair of filtered signals, applying the pair of filtered signals to a decoder that is configured to produce a pair of quadrature-output signals in a comparable form to the pair of test signals, comparing the pair of quadrature-output signals to the pair of quadrature-test signals to provide a measure of quadrature-mismatch between the pairs of filtered signals, and configuring a distortion-compensation component to apply a set of correction factors to a subsequent pair of signals to provide a pair of quadrature-corrected signals, wherein the correction factors are based on the measure of quadrature-mismatch between the pairs of filtered signals.

16. The method of claim 15, wherein the communications device includes a receiver that is configured to receive a quadrature-modulated composite signal and to provide therefrom a pair of quadrature-demodulated signals, the filter includes a receive-filter within the receiver that is configured to filter the pair of quadrature-demodulated signals to provide filtered-demodulated signals, and the distortion-compensation component includes a post-distortion compensation component that is configured to apply at least a part of the set of correction factors to the filtered-demodulated signals.

17. The method of claim 16, wherein the communications device further includes a transmitter that is configured to receive a pair of quadrature-input signals and to provide therefrom a quadrature-modulated transmission signal, the filter further includes a transmit-filter within the transmitter that is configured to filter the pair of quadrature-input signals to provide a pair of quadrature-filtered signals that are quadrature-modulated to provide the quadrature-modulated transmission signals, and the distortion-compensation component further includes a pre-distortion compensation component that is configured to apply at least a part of the set of correction factors to at least one of the pair of quadrature-input signals that are provided to the transmit-filter.

18. The method of claim 15, wherein the communications device includes a transmitter that is configured to receive a pair of quadrature-input signals and to provide therefrom a quadrature-modulated transmission signal, the filter includes a transmit-filter within the transmitter that is configured to filter the pair of quadrature-input signals to provide a pair of quadrature-filtered signals that are quadrature-modulated to provide the quadrature-modulated transmission signals, and the distortion-compensation component includes a pre-distortion compensation component that is configured to apply at least a part of the set of correction factors to at least one of the pair of quadrature-input signals that are provided to the transmit-filter.

* * * * *